(12) United States Patent
Papasakellariou (10) Patent No.: US 8,228,783 B2
(45) Date of Patent: Jul. 24, 2012

(54) BASE STATION TRANSMITTER FOR USE WITH AN OFDM COMMUNICATIONS SYSTEM, A METHOD OF DYNAMICALLY ALLOCATING OFDM SYMBOLS FOR PDCCH IN THE SYSTEM AND A USER EQUIPMENT RECEIVER FOR USE WITH THE SYSTEM

(75) Inventor: Aris Papasakellariou, Athens (GR)

(73) Assignee: Texas Instruments Incorporated, Dallas, TX (US)

( * ) Notice: Subject to any disclaimer, the term of this patent is extended or adjusted under 35 U.S.C. 154(b) by 1114 days.

(21) Appl. No.: 12/114,470

(22) Filed: May 2, 2008

(65) Prior Publication Data

US 2008/0273616 A1 Nov. 6, 2008

Related U.S. Application Data

(60) Provisional application No. 60/916,100, filed on May 4, 2007.

(51) Int. Cl.
*H04J 11/00* (2006.01)

(52) U.S. Cl. .......................... 370/206; 370/334

(58) Field of Classification Search .............. 370/206, 370/344, 347, 442; 714/790
See application file for complete search history.

(56) References Cited

U.S. PATENT DOCUMENTS 7,787,356 B2 * 8/2010 Kwon et al. ............... 370/206
2005/0160349 A1 * 7/2005 Cheun et al. ............... 714/790
2007/0097915 A1 5/2007 Papasakellariou

OTHER PUBLICATIONS

"3rd Generation Partnership Project; Technical Specification Group Radio Access Network; Physical Layer Procedures (Release 8)", 3GPP TS 36.213 V1.0.0, Mar. 2007, See Chapter 9 (Physical Downlink Control Channel Procedures).

"3rd Generation Partnership Project; Technical Specification Group Radio Access Network; Physical Channels and Modulation (Release 8)", 3GPP TS 36.211 V1.0.0, Mar. 2007, See section 5.4.3. (Physical resource mapping).

* cited by examiner

*Primary Examiner* — Yemane Mesfin
*Assistant Examiner* — Henry Baron
(74) *Attorney, Agent, or Firm* — Alan A. R. Cooper; Wade James Brady, III; Frederick J. Telecky, Jr.

(57) ABSTRACT

A base station transmitter for use with an orthogonal frequency division multiplexing (OFDM) communications system, a method of dynamically allocating OFDM symbols needed for a physical downlink control channel (PDCCH) in a downlink sub-frame from a base station and a user equipment (UE) receiver for use with the OFDM communications system. In one embodiment, the UE receiver includes: (1) a receive unit configured to receive a downlink signal, the signal having groups of control information and (2) a processing unit configured to extract from the groups of control information a number of OFDM symbols needed for PDCCH in a sub-frame of the downlink signal.

19 Claims, 5 Drawing Sheets

BASE STATION TRANSMITTER FOR USE WITH AN OFDM COMMUNICATIONS SYSTEM, A METHOD OF DYNAMICALLY ALLOCATING OFDM SYMBOLS FOR PDCCH IN THE SYSTEM AND A USER EQUIPMENT RECEIVER FOR USE WITH THE SYSTEM

CROSS-REFERENCE TO PROVISIONAL APPLICATION

This application claims the benefit of U.S. Provisional Application Ser. No. 60/916,100, filed by Aris Papasakellariou on May 4, 2007, entitled "Cat0 Transmission in E-UTRA DL," commonly assigned with the invention and incorporated herein by reference in its entirety.

TECHNICAL FIELD OF THE DISCLOSURE

The disclosure is directed, in general, to wireless communications and, more specifically, to a transmitter and a receiver of a wireless communications network, and a method of operating in the wireless communications network.

BACKGROUND OF THE DISCLOSURE

Universal Mobile Telecommunications System (UMTS) is a third-generation (3G) cell phone technology. Evolved-UMTS Terrestrial Radio Access (E-UTRA), also known as UMTS Long Term Evolution (3GPP LTE), is a key 3G technology to ensure the competitiveness of UMTS and provide a high-data-rate, low-latency and packet-optimized system. Unlike UMTS, which uses code division multiple access (CDMA) as the air interface, E-UTRA uses orthogonal frequency division multiplexing (OFDM) as the air interface.

In an OFDM cellular network, each cell employs a base station (ES) that communicates with any user equipment (UE), such as cell phones, laptop computers, or personal digital assistant (PDAs), active within its cell. When UE is first activated, it performs an initial cell search to connect to the cellular network. The initial cell search includes a downlink (DL) synchronization process between the BS and the UE in which the BS sends a synchronization signal to the UE.

After DL synchronization, the BS sends control information to the UE that the UE then uses to decode subsequent frames and sub-frames of data received from the BS. The UE must reliably receive the control information for the UE to be able to decode subsequently received data accurately. To guarantee fast and reliable receipt of control information, OFDM systems designate a fixed number of tones for transmitting the control information. Consequently, today's OFDM systems perform reliably and are capable of transmitting data at very high rates.

SUMMARY OF THE DISCLOSURE

To address the above-discussed deficiencies of the prior art, one aspect of the disclosure provides a base station transmitter for use with an OFDM communications system. In one embodiment, the base station transmitter includes a control information formatter configured to represent a number of OFDM symbols used for transmission of a physical downlink control channel (PDCCH) in a downlink sub-frame as two bits of control information and form a codeword with repetitions of bits representing said control information.

Another aspect of the disclosure provides a method of dynamically allocating OFDM symbols needed for PDCCH in a downlink sub-frame from a base station. In one embodiment, the method includes: (1) representing a number of OFDM symbols needed for PDCCH in a downlink sub-frame as two bits of control information, (2) forming a codeword with repetitions of bits representing said control information, (3) generating groups of control information based on the codeword, (4) spacing the groups across a bandwidth (BW) of the base station transmitter at a substantially equal spacing for transmission, (5) transmitting the substantially equally-spaced groups to user equipment, (6) receiving the substantially equally-spaced groups at the user equipment and (7) allocating, by the user equipment, a number of OFDM symbols in the downlink sub-frame for the PDCCH based on the substantially equally-spaced groups.

Yet another aspect of the disclosure provides a UE receiver for use with an OFDM communications system. In one embodiment the UE receiver includes: (1) a receive unit configured to receive a downlink signal, the signal having groups of control information and (2) a processing unit configured to extract from the groups of control information a number of OFDM symbols needed for PDCCH in a sub-frame of the downlink signal.

BRIEF DESCRIPTION OF THE DRAWINGS

For a more complete understanding of the disclosure, reference is now made to the following descriptions taken in conjunction with the accompanying drawings, in which.

DETAILED DESCRIPTION

Unlike a CDMA system, which can assign channels as needed for transmitting control information, an OFDM system has a limited number (i.e., 600) of frequencies (or "tones"). Because of this, a fixed number of tones are designated for transmitting control information. The amount of control information, however, can vary between sub-frames transmitted from the BS to the UE. It has been discovered that reserving a fixed number of tones for control information for each DL sub-frame may unnecessarily limit the number of tones that could be used for data transmission. An apparatus, method or system to reliably communicate control information in an E-UTPA environment and enhance overall data transmission that takes advantage of this discovery would be useful.

The disclosure provides a category zero transmission (Cat0) in a DL sub-frame of an E-UTRA system to achieve a target bit error rate (BER) for the Cat0 with a limited impact on the overall dedicated physical control channel (DPCCH) block error rate (BLER). The Cat0 may be considered as a first transmission of a BS to a UE after synchronization. The Cat0, also referred to as a physical control format indicator channel (PCFICH), is used to transmit two bits of information that indicate the number of OFDM symbols needed to transmit a physical downlink control channel (PDCCH) in a DL sub-frame. An E-UTRA DL sub-frame may have 14 OFDM symbols. In some embodiments, the DL sub-frame may have 12 OFDM symbols. The two bits of information may be referred to as a control format indicator (CFI). The PDCCH is sent on the first OFDM symbol of the DL sub-frame. The BER of the Cat0 is considered not as the error probability for one bit but as the probability that any of the two Cat0 bits is in error (in this sense, it is a stricter measure than the conventional BER and simply corresponds to the probability that Cat0 is erroneously received).

For transmission of Cat0, the disclosure repeats a representation of the two bits of control information to obtain a satisfactory BER of the Cat0 without needlessly sacrificing transmission overhead. The disclosure provides a simulation that demonstrates the overhead requirements for a Cat0 transmission to achieve BER of about 1% at the lowest points of the geometry distribution. It is shown that with transmission capturing the frequency diversity of the operating BW of a BS, Cat0 repetition greater than ten achieves the desired BER targets. The frequency diversity of the BW can be exploited by equally spacing the Cat0 across the BW for transmission to the UE. In some embodiments the frequency diversity of the BW can be exploited by using a spacing that is approximately equal. For those BWs where the number of tones may not support exact equal spacing, the spacing may be substantially equal between the transmitted control information.

Figure 1:
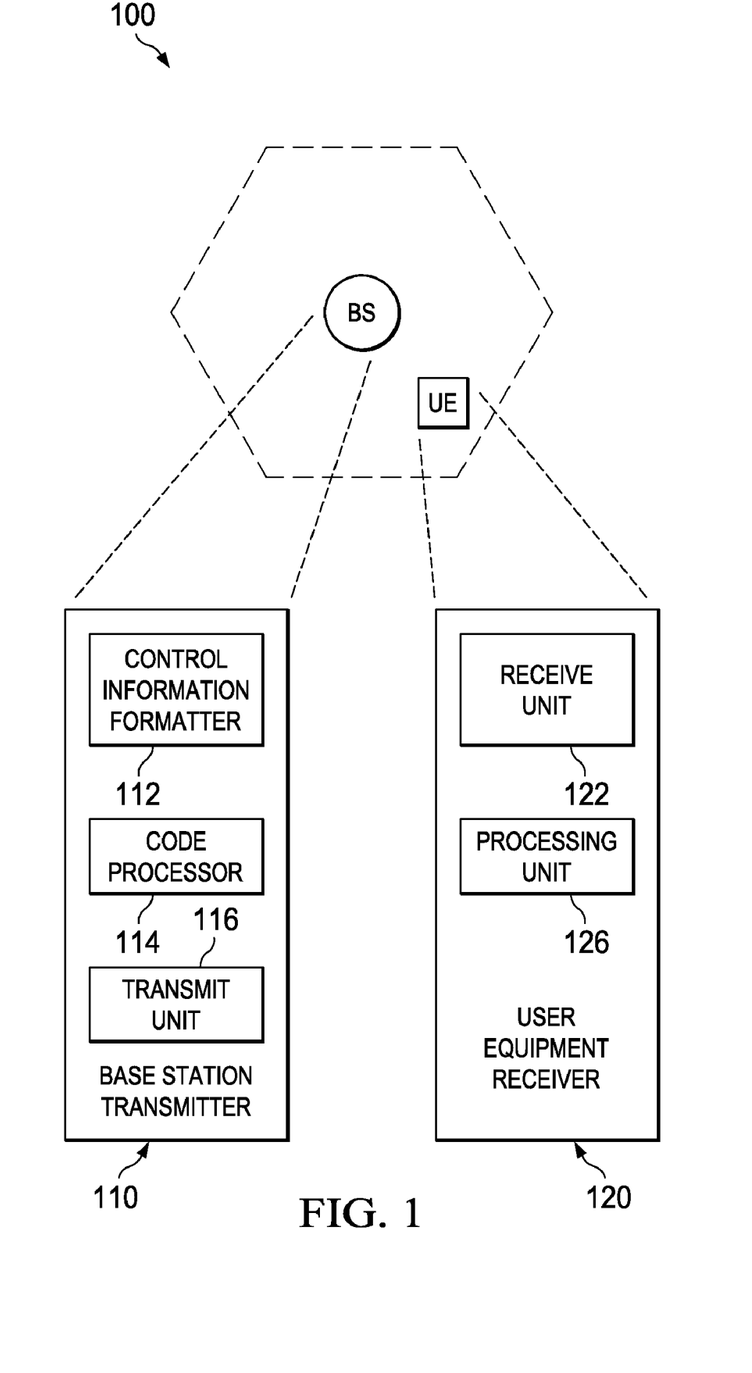
FIG. 1 is a diagram of an embodiment of a cellular network constructed in accordance with the principles of the disclosure.

FIG. 1 illustrates a diagram of an embodiment of a cellular network, generally designated 100, constructed in accordance with the principles of the disclosure. The cellular network 100 includes a cellular grid having a single cell employing a base station BS. The cellular network 100 also includes user equipment UE, which is located in the cell. The cellular network 100 may include additional UE and cellular grids with each additional cellular grid having a base station. The cellular network 100 may be an OFDM network (e.g., an OFDM or an OFDMA network) and may operate in compliance with E-UTRA.

The base station BS includes a BS transmitter 110 having a control information formatter 112, a code processor 114 and a transmit unit 116. As noted above, the cellular network 100 may be an E-UTRA network. Accordingly, the BS transmitter 110 may be an E-UTRA compliant transmitter. In different embodiments, the BS transmitter 110 may operate at various BWs including 1.25 MHz, 1.4 MHz, 2.5 MHz, 3 MHz, 5 MHz, 10 MHz and 20 MHz.

The control information formatter 112 is configured to represent a number of OFDM symbols used for transmission of a PDCCH in a downlink sub-frame from the BS to the UE as two bits of control information. The control information formatter 112 is further configured to form a codeword with repetitions of bits representing said control information. The number of repetitions needed can be based on a desired BER for the two bits of control information with respect to the overall DPCCH BLER. Thus, a target BER can be achieved without adversely impacting the overall DPCCH BLER. As illustrated in FIGS. 3A, 3B, 4A, and 4B, about 12 repetitions (e.g., 10 to 12) may be used to achieve an acceptable BER and DPCCH BLER.

The control information formatter 112 may employ block coding to form the codeword from the two bits of control information. The two bits of control information may be coded with a $\frac{1}{16}$ block code. In one embodiment, the codeword may be 32 bits and the control information formatter 112 may represent the two bits of control information as three bits and repeat the three bits until obtaining 32 bits to form the codeword. Table 1 represents how the two bits of control information may be represented and repeated to form a 32 bit codeword. The two bits of control information in Table 1 are referred to as CFI (control format indicator) bits.

TABLE 1

Example of Forming a Codeword

| CFI | $b_0$ | ... | ... | $b_{31}$ |
|---|---|---|---|---|
| 1 | 0,1,1 0,1,1 0,1,1 0,1,1 0,1,1 0,1,1 0,1,1 0,1,1 0,1,1 0,1,1 | | | 0,1 |
| 2 | 1,0,1 1,0,1 1,0,1 1,0,1 1,0,1 1,0,1 1,0,1 1,0,1 1,0,1 1,0,1 | | | 1,0 |
| 3 | 1,1,0 1,1,0 1,1,0 1,1,0 1,1,0 1,1,0 1,1,0 1,1,0 1,1,0 1,1,0 | | | 1,1 |

For example, if one OFDM symbol is needed for transmission of PDCCH in a sub-frame, the number of needed OFDM symbols may be represented by the three digits 0,1,1. The three digits are then repeated until obtaining a total of 32 bits to form a codeword. Repetitions of the three digit representation 0,1,1, provides a sufficient BER for the control information. The process is repeated similarly for two needed OFDM symbols (1,0,1) and three needed OFDM symbols (1,1,0).

The code processor 114 is configured to form groups of control information based on the codeword and substantially equally-space (which may include equally-space) the groups across the BW of the base station transmitter for transmission. For example, using the 32 bit codeword discussed above with respect to Table 1, the code processor 114 may convert the 32 bit codeword to quadrature phase-shift keying (QPSK) symbols and form the groups from the QPSK symbols. In one embodiment, the code processor 114 may convert the 32 bit codeword to 16 QPSK symbols and form four quadruplets from the 16 QPSK symbols to be substantially equally-spaced across the BW for transmission. In this embodiment, considering the BS transmitter 110 operates at a BW of 10 MHz, the code processor 114 can space each of the four quadruplets 150 tones apart for transmission. For some BWs in different embodiments, the number of tones may not support exact equal spacing. Accordingly, the code processor may space the groups using substantially equal spacing wherein the number of tones between the groups may not be exactly the same.

A scrambling process may be used on the 32 bit codeword before modulation. Standard QPSK modulation may be used to form the 16 QPSK symbols. With multiple antennas, mapping of the symbols and precoding may be performed. With one transmission antenna, this may be skipped.

The transmit unit 116 is configured to transmit the substantially equally-spaced groups (which may be equally-spaced groups) to the UE. The transmit unit 116 may be an E-UTRA compliant transmit unit. The UE may also be E-UTRA compliant.

The UE includes a user equipment receiver 120 having a receive unit 122 and a processing unit 126. The receive unit 122 is configured to receive a downlink signal from the BS. The downlink signal includes the groups of control information. Each of the groups of control information is substantially equally-spaced (which may be equally-spaced) across a BW of the BS. The processing unit 126 is configured to extract from the groups of control information a number of OFDM symbols needed for PDCCH in a sub-frame of the downlink signal.

After extracting the number of needed symbols, the processing unit 126 is further configured to allocate OFDM symbols for the PDCCH based on the extracted number. In one embodiment, the processing unit 126 may allocate up to 3 OFDM symbols for the PDCCH. By extracting the number of needed OFDM symbols for the PDCCH, the processing unit 126 can dynamically allocate the number of PDCCH for each downlink sub-frame received from the base station. As such, a fixed number of OFDM symbols do not need to be reserved which can result in wasted overhead.

Figure 2:
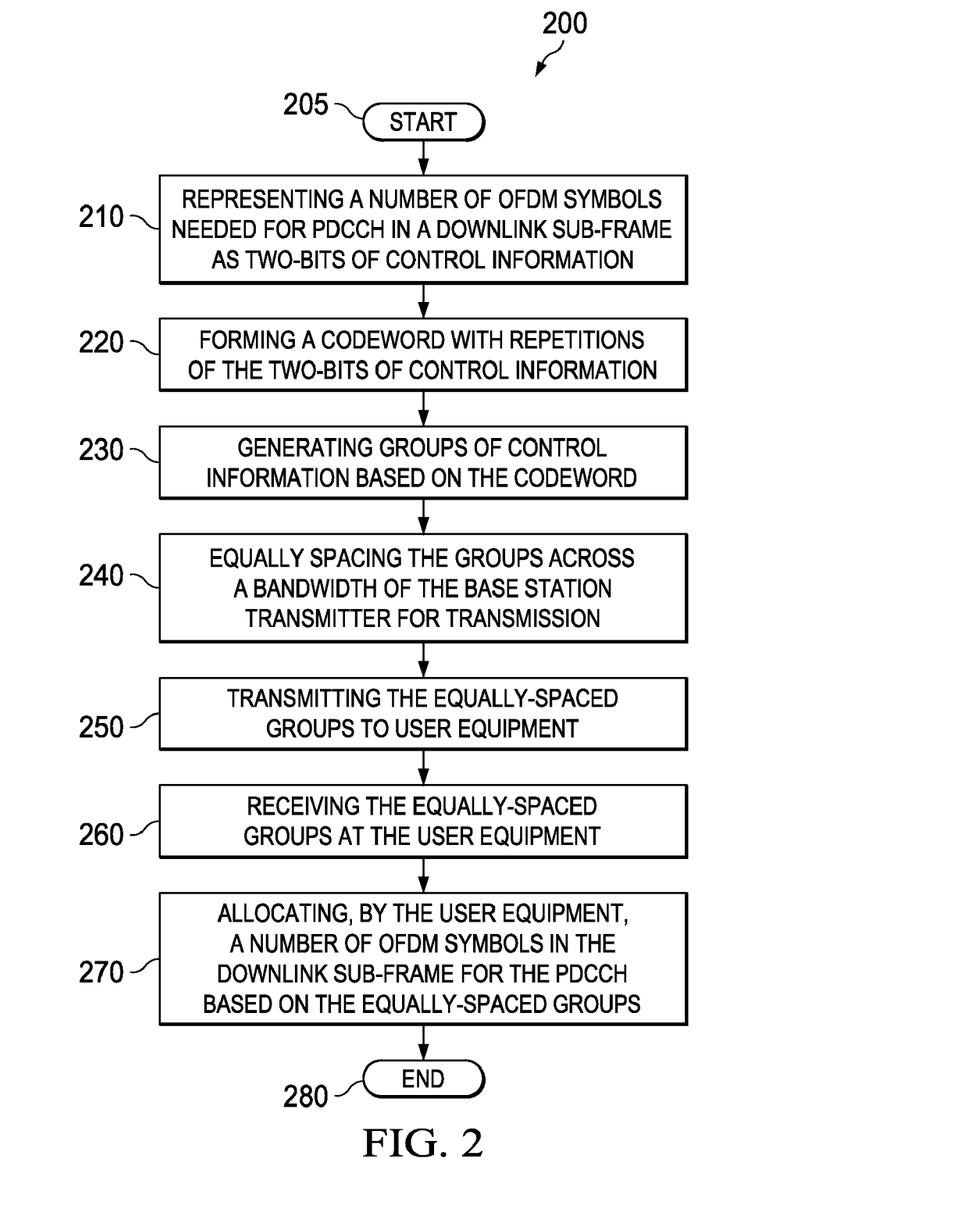
FIG. 2 is a flow diagram of an embodiment of a method of dynamically allocating OFDM symbols for PDCCH carried out according to the principles of the disclosure.

FIG. 2 is a flow diagram of an embodiment of a method 200 of dynamically allocating OFDM symbols for PDCCH carried out according to the principles of the disclosure. At least part of the method may be performed by UE or a BS of an E-UTRA communications network. The method begins with an intent to allocate OFDM symbols for PDCCH in a step 205.

After beginning, a number of OFDM symbols needed for PDCCH in a downlink sub-frame are represented as two bits of control information in a step 210.

A codeword is then formed with repetitions of bits of representing the control information in a step 220. The codeword may be 32 bits and the repetitions may be of a three-bit representation of the two bits of control information. Block coding may be employed to form the codeword. In one embodiment, the codeword may be coded with a 1/16 block code.

After forming the codeword, groups of control information are generated based on the codeword in a step 230. In one embodiment, the groups may be generated by converting a 32 bit codeword to QPSK symbols and forming the groups from the QPSK symbols. The 32 bit codeword may be converted to 16 QPSK symbols and formed into four quadruplets.

The groups are then substantially equally-spaced across the BW of a base station transmitter for transmission in a step 240. After spacing the groups, the substantially equally-spaced groups are transmitted to UE in a step 250. In some embodiments, the groups may be transmitted over a 10 MHz BW and with each of the groups equally separated by 150 tones.

The transmitted groups are received at the UE in a step 260. Subsequently, in a step 270, the UE allocates a number of OFDM symbols in the downlink sub-frame for the PDCCH based on the substantially equally-spaced groups. The UE can allocate the number of OFDM based on extracted control information (e.g., from the two bits of control information) represented in the groups. The method 200 then continues to a step 280 and ends.

To demonstrate the results of repeating the two bits of control information (Cat0), a simulation was performed as represented in the following FIGs. The simulations examine the Cat0 transmission requirements, under various operating conditions, in terms of the required overhead to achieve a target BER which will not result into any appreciable impact of the overall DPCCH BLER. The simulation assumptions are provided below in Table 2.

TABLE 2

Simulation Assumptions

| Parameter | Assumption |
|---|---|
| Cat0 Size | 2 bits |
| Cat0 Coding | Repetition |
| PDCCH size | 40 bits |
| Bandwidth | 5 MHz (2.0 GHz) |
| Channel Model | Ped. A, TU6, 10 Kmph |
| Antenna Configuration | 1 or 2 (SFBC) at Transmitter, 2 at Receiver |
| Channel Estimation Time Interpolation | Averaging |
| Channel Estimation Frequency Interpolation | Least Squares |
| Buffering for Channel Estimation | RS from Current and Preceding sub-frames |

Cat0 is assumed to be transmitted only in the first OFDM symbol of the DL sub-frame because the PDCCH may occupy only one OFDM symbol and its decoding latency should be minimized. For brevity, the Cat0 BER is presented only for 10 Kmph in order to capture the most important range of UE speeds for E-UTRA (for higher UE speeds, the only difference is an additional fractional decibel penalty due to channel estimation losses).

As noted previously, the BER is considered not as the error probability for one bit but as the probability that any of the 2 Cat0 bits is in error. As such, it can be considered a stricter measure than the conventional BER and simply corresponds to the probability that Cat0 is erroneously received.

For the DPCCH transmission, the Cat0 transmission exploits the frequency diversity of the channel. The channel BW is divided into a number of regions equal to the number of Cat0 repetitions. For example, for four repetitions, the Cat0 transmission is at the {0.1.5, 3, 4.5} MHz regions of the BW.

The examined channel models are the typical urban 6 (TU6) and the pedestrian channel A (PA). Since cell edge UE (those having low signal to interference-plus-noise power ratios, or SINRs) typically experiences the full frequency selectivity of the channel, TU6 captures this. However, for smaller BWs or when there is some correlation between the 2 Rx antennas, a flatter channel model is more appropriate and the performance with the PA channel is also evaluated to capture a worst case (and pessimistic) setup and provide a lower performance bound.

Figure 3A:
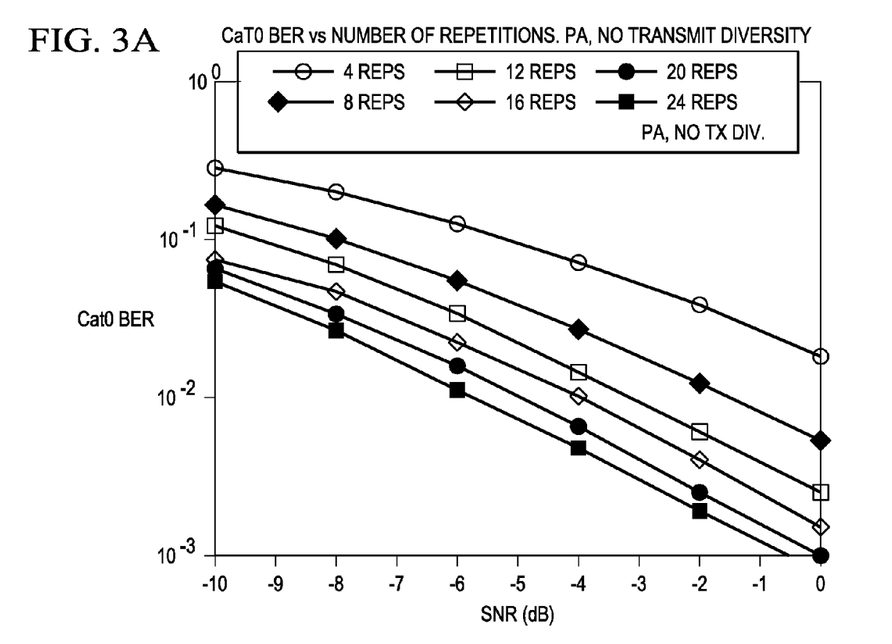
FIG. 3A is a graph representing, in a pedestrian channel A (PA) model, a bit error rate (BER) for a Cat0 transmission with no transmit diversity versus the number of repetitions for the Cat0.
Figure 3B:
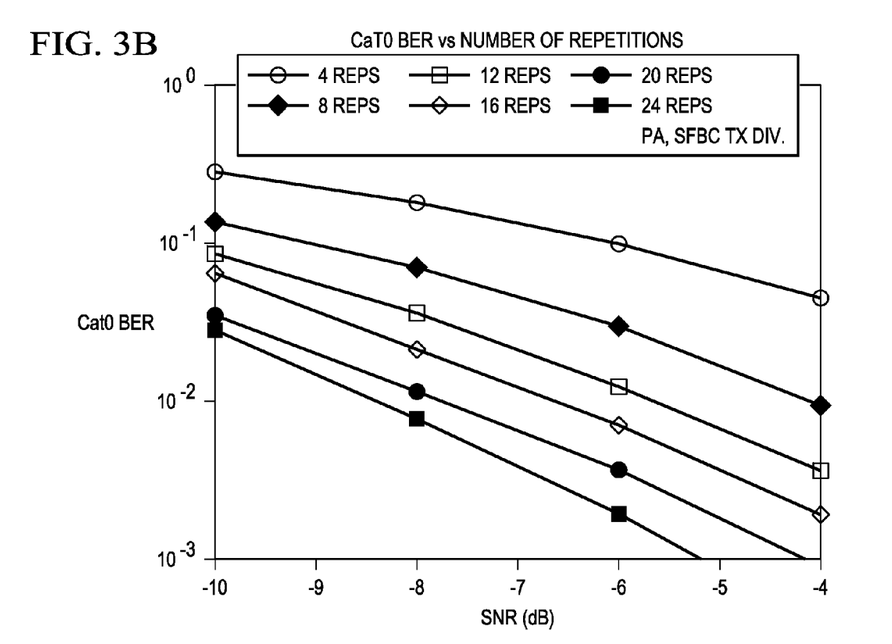
FIG. 3B is a graph representing, in a PA model, a BER for a Cat0 transmission with transmit diversity versus the number of repetitions for the Cat0.
Figure 4A:
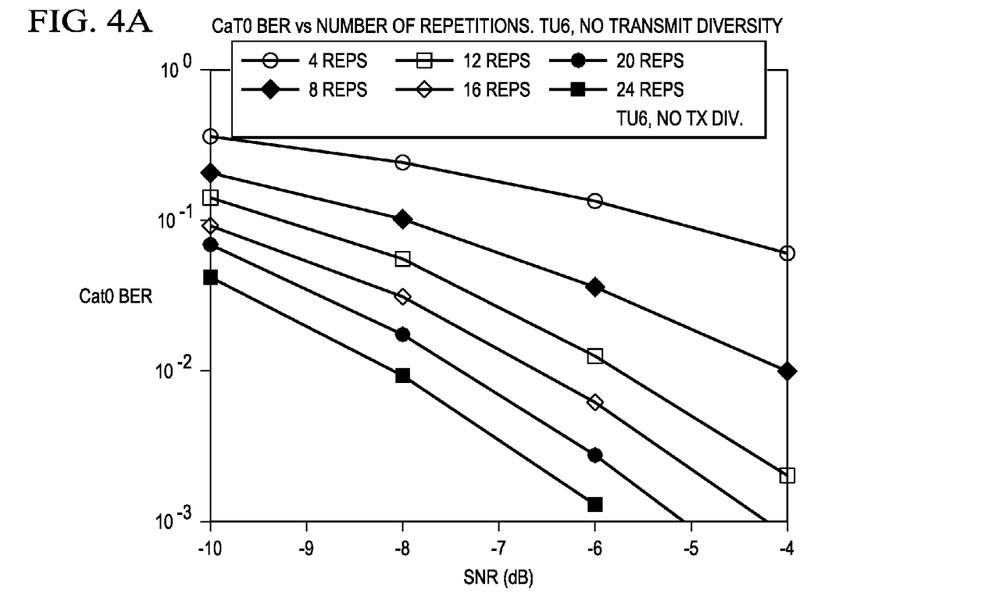
FIG. 4A is a graph representing, in a typical urban 6 (TU6) channel model, a BER for a Cat0 transmission with no transmit diversity versus the number of repetitions for the Cat0.
Figure 4B:
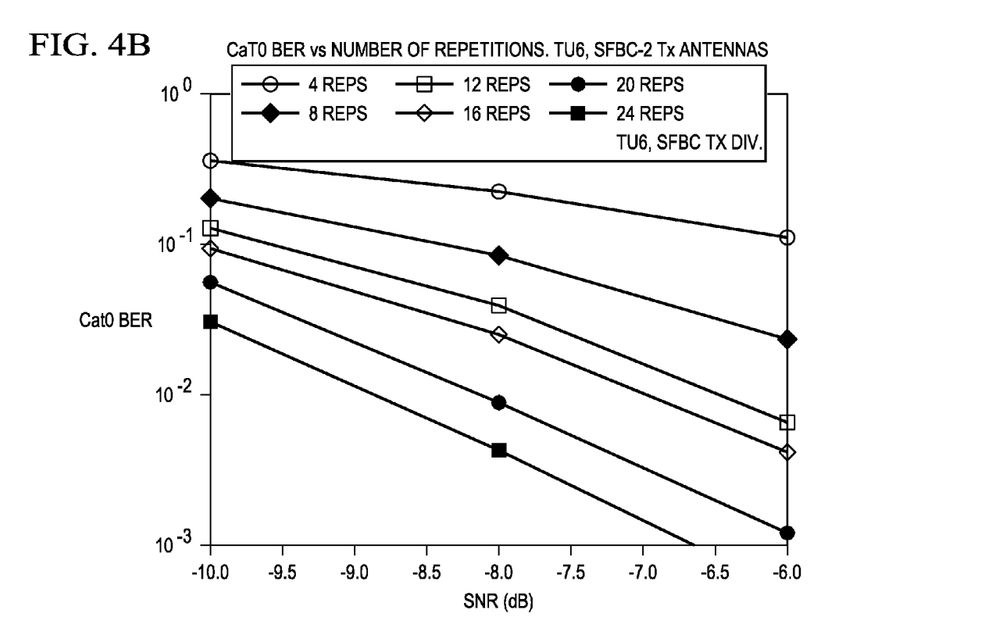
FIG. 4B is a graph representing, in a TU6 channel model, a BER for a Cat0 transmission with transmit diversity versus the number of repetitions for the Cat0.

FIG. 3A is a graph representing, in a pedestrian channel A (PA) model, a BER for a Cat0 transmission with no transmit diversity versus the number of repetitions for the Cat0. FIG. 3B is a graph representing, in a PA model, a BER for a Cat0 transmission with transmit diversity versus the number of repetitions for the Cat0. In FIG. 4A is a graph representing, in a typical urban 6 (TU6) channel model, a BER for a Cat0 transmission with no transmit diversity versus the number of repetitions for the Cat0. FIG. 4B is a graph representing, in a TU6 channel model, a BER for a Cat0 transmission with transmit diversity versus the number of repetitions for the Cat0.

In order to avoid Cat0 impacting PDCCH reception, the target BER for Cat0 should be below the PDCCH BLER.

Cat0 transmission may be designed considering that it is received with the target BER by scheduled UEs having the worst SINR in any sub-frame. Moreover, adaptation of the transmission power is always possible by reducing it in case the worst SINR of a scheduled UE is above the one required for the Cat0 provisioned resources and by possibly increasing it above the nominal level if the worst SINR is at the lowest 1%-2% of the geometry distribution. Nevertheless, robust Cat0 transmission needs to be ensured without reliance on significantly boosting transmit power.

To avoid over-dimensioning the resources required for Cat0 transmission, the target BER can be around 1% (or around the PDCCH target BLER) for the worst SINR of a scheduled UE at any sub-frame. This may prove adequate since the PDCCH reception of UEs in better SINR conditions will not be affected by Cat0. For a scheduled UE with a worst possible SINR, the overall error probability of incorrect PDCCH decoding only increases from 1% to 2%.

Figure 5:
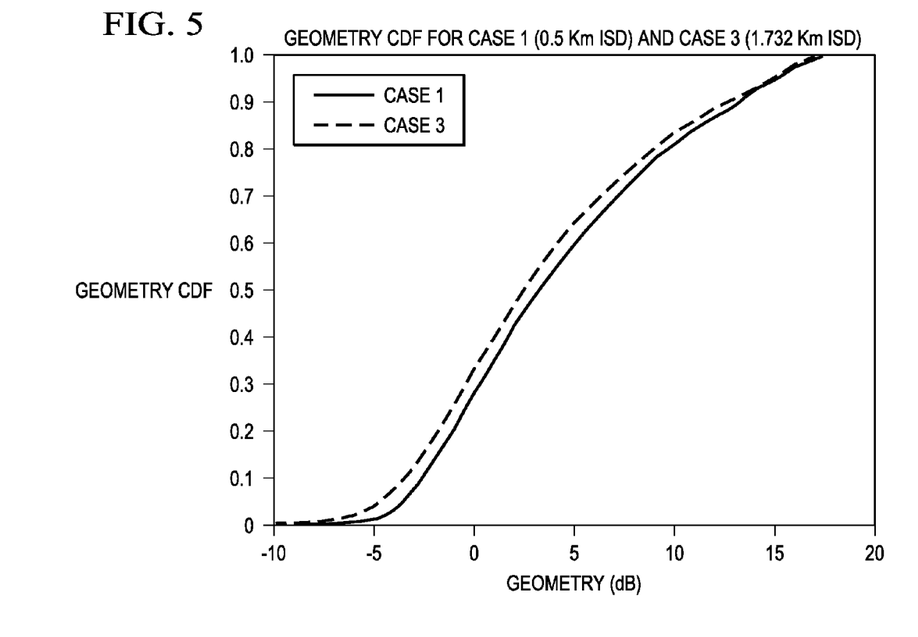
FIG. 5 is a graph representing the geometry distribution for cases 1 and 3 according to Physical Layer Aspects for E-UTRA (Release 7), version 7.1.0.
Figure 6:
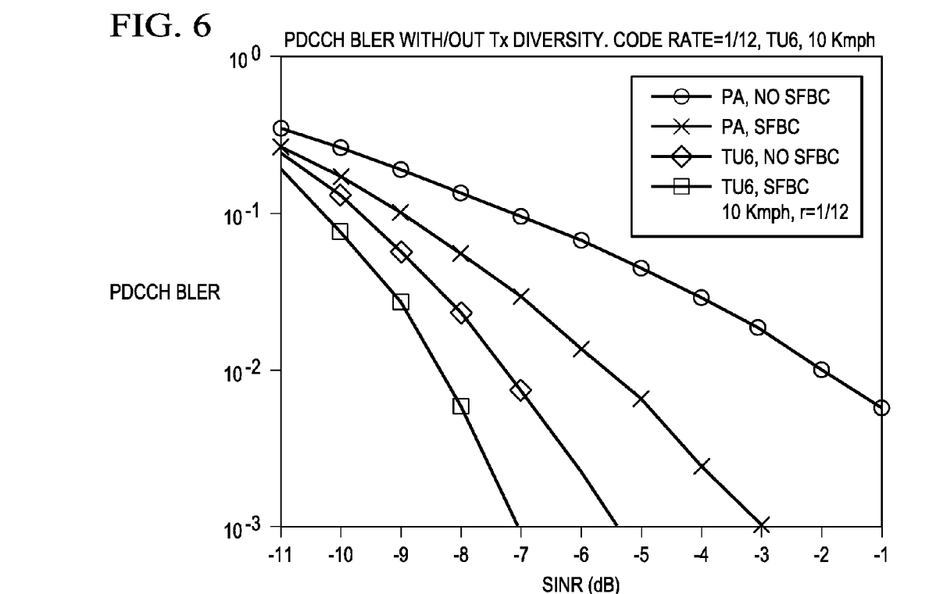
FIG. 6 is a graph representing the PDCCH block error rate (BLER) with code rate $1/12$ for the PA and TU channels with and without transmit diversity.

FIG. 5 is a graph representing the geometry distribution for cases 1 and 3 according to the Physical Layer Aspects for E-UTRA (Release 7), version 7.1.0. Case 3 presents the worse setup in terms of SINR and 96% of UEs have SINR above −5 dB. FIG. 6 is a graph representing the PDCCH BLER with code rate $1/12$ for the PA and TU channels with and without transmission diversity.

Although the SINR distribution for scheduled UEs with a PF scheduler can be expected to be better than the average long term SINR distribution, because of the larger CQI errors at the lowest SINR regions (and possibly because of delay sensitive traffic), the average SINR distribution can serve as a more conservative indication of the target SINR operating point. From FIGS. 3A, 3B and 6, it can be observed that for flat channels, the PDCCH with the lowest code rate of $1/12$ requires larger SINR to achieve 1% BLER than the corresponding one for Cat0 BER with 12 repetitions to achieve BER of 1% For TU6 channel, having 12 repetitions for Cat0 (1 RB total overhead) is also adequate as the required SINR for 1 BER is below the 2% geometry CDF point.

Table 3 below summarizes the overhead Cat0 transmission over 1 RB represents for the various operating BWs as a percentage of the overall overhead and as a percentage of the total resources. The overall overhead is assumed to be 3 OFDM symbols (including RS and other overhead). Even at 1.25 MHz, this overhead is not significant compared to the ability to dimension the PDCCH with granularity of 0.5 or 1 OFDM symbols.

TABLE 3

Relative Cat0 Overhead

| | 1.25 MHz | 2.5 MHz | 5 MHz | 10 MHz | 20 MHz |
|---|---|---|---|---|---|
| % of Total Overhead | 5.3% | 2.7% | 1.3% | 0.7% | 0.3% |
| % of Total Resources | 1.1% | 0.6% | 0.3% | 0.15% | 0.07% |

The simulation evaluates the overhead requirements for the Cat0 transmission to achieve BER of about 1% at the lowest points of the geometry distribution. The simulation demonstrates that with transmission capturing the frequency diversity of the operating BW, Cat0 repetition of about 12 achieves the desired BER targets. Repetitions of less than 12 may also be sufficient to achieve BER targets while providing less of an adverse affect on the overhead. The corresponding overhead naturally varies with the operating BW but even for the smallest one of 1.25 MHz, this overhead is low compared to the savings in the PDCCH overhead in the range of 0.5 or one OFDM symbols (depending on the mapping between the Cat0 bits and the PDCCH size).

At least a portion of the above-described apparatuses and methods may be embodied in or performed by various conventional digital data processors or computers, wherein the computers are programmed or store executable programs of sequences of software instructions to perform one or more of the steps of the methods, e.g., steps of the method of FIG. 2. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 2.

Those skilled in the art to which the disclosure relates will appreciate that other and further additions, deletions, substitutions and modifications may be made to the described embodiments without departing from the scope of the disclosure.

What is claimed is:

1. A base station transmitter for use with an OFDM communications system, comprising:
a control information formatter configured to represent a control format indicator which indicates a number of OFDM symbols used for transmission of a PDCCH in a downlink sub-frame as two bits of control information, and to form a codeword with repetitions of said two bits of control information,
a code processor configured to form groups of control information based on said codeword and substantially equally space said groups across a bandwidth of said base station transmitter for transmission; and
a transmit unit configured to transmit said substantially equally spaced groups,
wherein said OFDM communications system is an E-UTRA-compliant communications system.

2. The transmitter as recited in claim 1 wherein said control information formatter employs block coding to form said codeword from said two bits of control information.

3. The transmitter as recited in claim 1 wherein said codeword is 32 bits.

4. The transmitter as recited in claim 3 wherein said code processor is configured to convert said 32 bit codeword to QPSK symbols and form said groups from said QPSK symbols.

5. The transmitter as recited in claim 4 wherein said code processor is configured to convert said 32 bit codeword to 16 QPSK symbols and form four quadruplets from said 16 QPSK symbols to be equally-spaced across said bandwidth for transmission.

6. The transmitter as recited in claim 5 wherein said bandwidth is 10 MHz and each of said four quadruplets are spaced 150 tones apart for transmission.

7. A method of dynamically allocating OFDM symbols needed for PDCCH in a downlink sub-frame from a base station, comprising:
representing a control format indicator which indicates a number of OFDM symbols needed for PDCCH in a downlink sub-frame as two bits of control information;
forming a codeword with repetitions of said two bits of control information;
generating groups of control information based on said codeword;

spacing said groups across a bandwidth of said base station transmitter at a substantially equal spacing for transmission;

transmitting said substantially equally-spaced groups to user equipment;

receiving said substantially equally-spaced groups at said user equipment; and allocating, by said user equipment, a number of OFDM symbols in said downlink sub-frame for said PDCCH based on said substantially equally-spaced groups, wherein said OFDM symbols are employed in an E-UTRA-compliant communications system.

8. The method as recited in claim 7 wherein said forming said codeword includes employing block coding.

9. The method as recited in claim 7 wherein said codeword is 32 bits.

10. The method as recited in claim 9 wherein said generating includes converting said 32 bit codeword to QPSK symbols and forming said groups from said QPSK symbols.

11. The method as recited in claim 10 wherein said generating includes converting said 32 bit codeword to 16 QPSK symbols and forming four quadruplets from said 16 QPSK symbols.

12. The method as recited in claim 11 wherein said bandwidth is 10 MHz and said transmitting includes transmitting each of said four quadruplets 150 tones apart.

13. The method as recited in claim 7 wherein said number of OFDM symbols allocated is a maximum of three.

14. A user equipment receiver for use with an OFDM communications system, comprising:

a receive unit configured to receive a downlink signal having groups of control information; and a processing unit configured to extract from said groups of control information a control format indicator which indicates a number of OFDM symbols needed for PDCCH in a sub-frame of said downlink signal, wherein said receiving unit receives said signal from a base station and said processing unit dynamically allocates said number for each downlink sub-frame received from said base station, wherein said processing unit is further configured to allocate a number of OFDM symbols for said PDCCH based on said number, wherein said base station and said receiver are E-UTRA compliant, wherein a maximum number of OFDM symbols allocated by said processing unit is three, and wherein each of said groups of control information is substantially equally spaced across a bandwidth of said base station.

15. A base station transmitter for use with an OFDM communications system, comprising:

a control information formatter configured to represent a number of OFDM symbols used for transmission of a PDCCH in a downlink sub-frame as two bits of control information and form a codeword with repetitions of said two bits of control information, a code processor configured to form groups of control information based on said codeword and substantially equally space said groups across a bandwidth of said base station transmitter for transmission;

a transmit unit configured to transmit said substantially equally spaced groups, wherein said control information formatter employs block coding to form said codeword from said two bits of control information, wherein said codeword is 32 bits, and wherein said code processor is configured to convert said 32 bit codeword to QPSK symbols and form said groups from said QPSK symbols.

16. The transmitter as recited in claim 15 wherein said code processor is configured to convert said 32 bit codeword to 16 QPSK symbols and form four quadruplets from said 16 QPSK symbols to be substantially equally-spaced across said bandwidth for transmission.

17. A method of dynamically allocating OFDM symbols needed for PDCCH in a downlink sub-frame from a base station, comprising:

representing a control format indicator which indicates a number of OFDM symbols needed for PDCCH in a downlink sub-frame as two bits of control information;

forming a codeword with repetitions of said two bits of control information;

generating groups of control information based on said codeword;

spacing said groups across a bandwidth of said base station transmitter at a substantially equal spacing for transmission;

transmitting said substantially equally-spaced groups to user equipment;

receiving said substantially equally-spaced groups at said user equipment; and allocating, by said user equipment, a number of OFDM symbols in said downlink sub-frame for said PDCCH based on said substantially equally-spaced groups, wherein said codeword is 32 bits, and wherein said generating includes converting said 32 bit codeword to QPSK symbols and forming said groups from said QPSK symbols.

18. The method as recited in claim 17, wherein said OFDM symbols are employed in an E-UTRA-compliant communications system.

19. The method as recited in claim 17 wherein said generating includes converting said 32 bit codeword to 16 QPSK symbols and forming four quadruplets from said 16 QPSK symbol.

* * * * *